US011192063B2

United States Patent
Gromotka et al.

(10) Patent No.: US 11,192,063 B2
(45) Date of Patent: Dec. 7, 2021

(54) APPARATUS, METHOD, AND SYSTEM FOR REDUCING MOISTURE IN LED LIGHTING FIXTURES

(71) Applicant: Musco Corporation, Oskaloosa, IA (US)

(72) Inventors: Gabriel P. Gromotka, Pella, IA (US); Kurt C. Herr, Jr., Centerville, IA (US); Luke C. McKee, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 16/741,049

(22) Filed: Jan. 13, 2020

(65) Prior Publication Data

US 2020/0222849 A1 Jul. 16, 2020

Related U.S. Application Data

(60) Provisional application No. 62/791,941, filed on Jan. 14, 2019, provisional application No. 62/799,281, filed on Jan. 31, 2019.

(51) Int. Cl.
*B01D 53/26* (2006.01)
*F21V 15/01* (2006.01)

(52) U.S. Cl.
CPC .......... *B01D 53/261* (2013.01); *F21V 15/01* (2013.01); *B01D 2253/106* (2013.01);
(Continued)

(58) Field of Classification Search
CPC .......... B01D 53/261; B01D 2253/106; B01D 2253/11; B01D 2253/112;
(Continued)

(56) References Cited

U.S. PATENT DOCUMENTS

| 4,612,607 A * | 9/1986 | Segoshi | F21S 45/33 |
|---|---|---|---|
| | | | 362/547 |
| 4,796,163 A * | 1/1989 | Dressier | F21S 45/33 |
| | | | 362/547 |

(Continued)

FOREIGN PATENT DOCUMENTS

| CN | 108826021 A | 11/2018 |
|---|---|---|
| KR | 101453290 B1 | 11/2014 |
| WO | 02077522 A2 | 10/2002 |

OTHER PUBLICATIONS

International Preliminary Report on Patentability PCT; Park, Hye Lyun (dated 2021).*

(Continued)

*Primary Examiner* — Rajarshi Chakraborty
*Assistant Examiner* — Glenn D Zimmerman
(74) *Attorney, Agent, or Firm* — McKee, Voorhees & Sease PLC

(57) ABSTRACT

Sealed LED lighting fixtures operated under certain conditions (e.g., outdoors, in cold ambient environments, at high operating current, and/or in non-hermetic environments) will oftentimes exhibit condensation on an inner surface of the emitting face of the fixture. When occurring, said condensation impairs the ability to produce useful light—namely, light harnessed and directed in a manner so to provide lighting for a task (or otherwise desired)—by diffusing light emitted from the lighting fixture. Envisioned are apparatus, methods, and systems to reduce moisture in sealed LED lighting fixtures so to reduce or eliminate condensation, and in a manner that addresses both fixtures already in the field and those being assembled.

4 Claims, 18 Drawing Sheets

Figure 1:
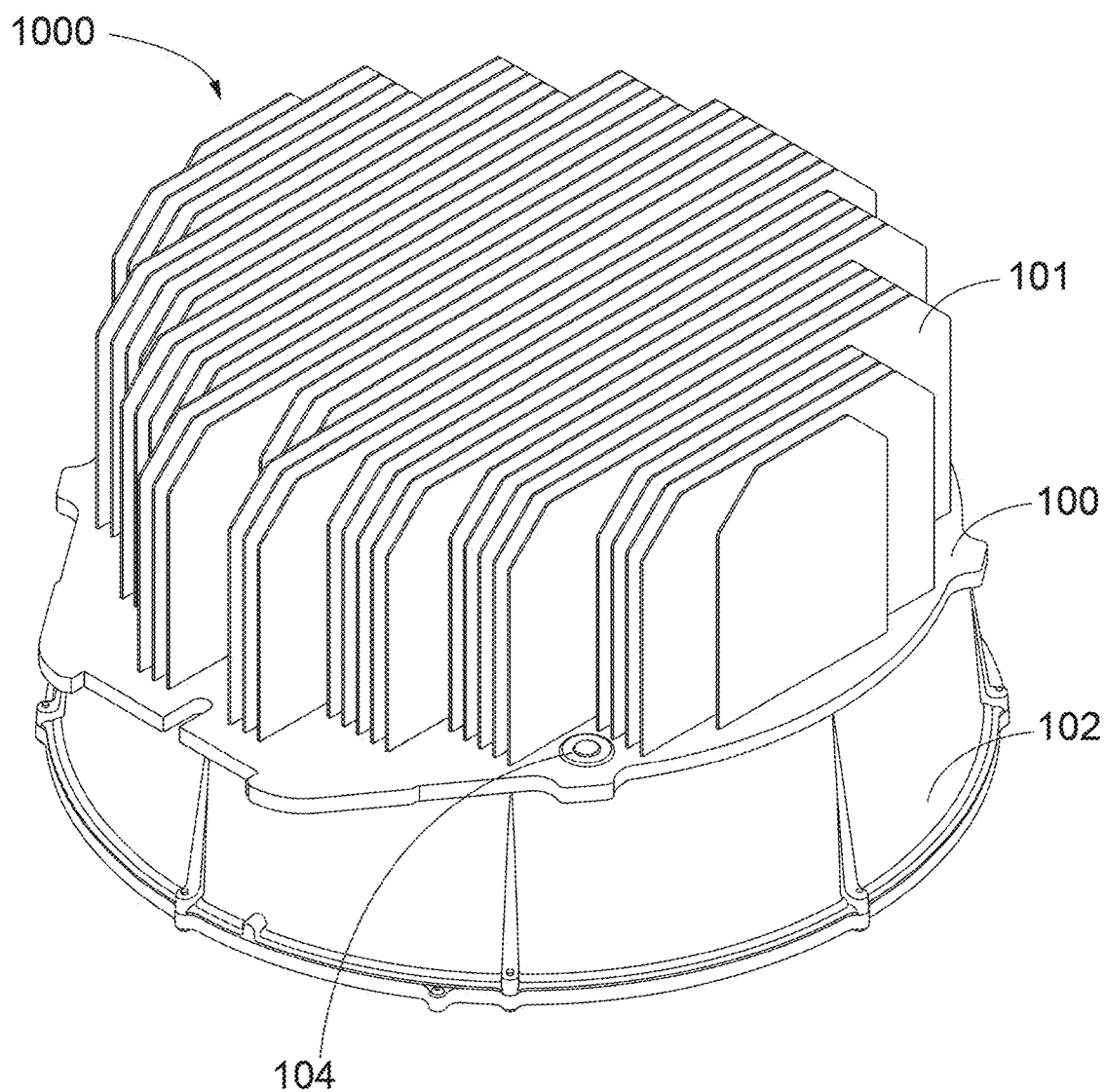

(52) U.S. Cl.
CPC .... *B01D 2253/11* (2013.01); *B01D 2253/112* (2013.01); *B01D 2253/116* (2013.01)

(58) Field of Classification Search
CPC ... B01D 2253/116; F21V 15/01; F21V 31/03; F21V 31/00; F21Y 2115/10
See application file for complete search history.

(56) References Cited

U.S. PATENT DOCUMENTS

| | | | | |
|---|---|---|---|---|
| 4,809,144 | A * | 2/1989 | Suzuki | F21S 45/33 362/547 |
| 9,803,415 | B2 | 10/2017 | Ferri et al. | |
| 2002/0170437 | A1* | 11/2002 | DeGuiseppi | B01D 53/261 96/134 |
| 2005/0098475 | A1* | 5/2005 | Dick | H05K 13/0084 206/714 |
| 2005/0105300 | A1* | 5/2005 | Pajer | F21S 45/33 362/516 |
| 2005/0157514 | A1* | 7/2005 | Brinkmann | B60Q 1/0005 362/547 |
| 2006/0150817 | A1* | 7/2006 | DeGuiseppi | B01D 53/263 96/108 |
| 2009/0122570 | A1 | 5/2009 | Hsu et al. | |
| 2015/0241009 | A1* | 8/2015 | Brendle | F21S 41/36 362/521 |
| 2018/0266663 | A1* | 9/2018 | Monestier | B23P 19/04 |
| 2019/0271449 | A1* | 9/2019 | Helwig | F21S 45/60 |
| 2020/0222849 | A1 | 7/2020 | Gromotka et al. | |

OTHER PUBLICATIONS

International Searching Authority in connection with PCT/US2020/013324 filed Jan. 13, 2020, "The International Search Report and the Written Opinion of the International Searching Authority, or the Declaration", 13 pages, dated May 8, 2020.

Van Den Bergh et al., "Window Spacers and Edge Seals in Insulating Glass Units: A State-of-the-Art Review and Future Perspectives", Energy and Buildings, vol. 58, pp. 263-280, published Jan. 2013.

Korean Intellectual Property Office, "Notice to File a Response" in connection with Korean Application No. 10-2021-0067100 filed May 25, 2021, 9 pages, dated Jul. 20, 2021.

English Translation of Korean Intellectual Property Office, "Notice to File a Response" in connection with Korean Application No. 10-2021-0067100 filed May 25, 2021, 10 pages, dated Jul. 20, 2021.

* cited by examiner

APPARATUS, METHOD, AND SYSTEM FOR REDUCING MOISTURE IN LED LIGHTING FIXTURES

CROSS-REFERENCE TO RELATED APPLICATIONS

This application claims priority under 35 U.S.C. § 119 to provisional U.S. application Ser. No. 62/791,941, filed Jan. 14, 2019, and provisional U.S. application Ser. No. 62/799,281, filed Jan. 31, 2019, both of which are hereby incorporated by reference in their entireties.

I. TECHNICAL FIELD OF INVENTION

The present invention generally relates to removing moisture from lighting fixtures. More specifically, the present invention relates to (i) in situ or field repairs of lighting fixtures which exhibit internal condensation under at least some conditions, and to (ii) apparatus, methods, and systems implemented in a factory setting so to avoid or minimize adverse impact from moisture in lighting fixtures.

II. BACKGROUND OF THE INVENTION

It is well known that lighting fixtures are designed to not only produce light, but produce useful light; namely, light harnessed and directed in a manner so to provide lighting for a task (or otherwise desired). For the example of sports lighting, lighting fixtures are mounted high above a field or other target area, aimed generally towards some portion of the field (or space above the field) at both a horizontal and vertical angle sufficient to light the target area but not so severe as to cause glare along common player lines of sight. The light projected from each fixture in an array of such elevated and aimed fixtures is specifically designed to provide a beam of particular dimensions and intensity. In this manner, lighting specifications are met by layering a number of these beams from a number of elevated lighting fixtures so to create a composite beam. So it can be seen that misalignment of any of the many lighting fixtures in an array can adversely impact the composite beam, and by extension, cause a failure in meeting specifications. However, the same undesirable outcome can be produced when the light emitted from any of the many lighting fixtures is adversely impacted such that the individual beam is not of the desired dimensions and intensity.

Lighting fixtures such as the aforementioned rely on a number of different light directing devices (e.g., secondary lenses) and light redirecting devices (e.g., reflectors) to harness the light emitted from the light sources (e.g., a plurality of LEDs) and shape/direct it into light which is useful for an application. Light directing devices and light redirecting devices may be installed in a lighting fixture housing (e.g., proximate the light sources), outside a lighting fixture housing (e.g., proximate the emitting face of the lighting fixture housing), or both. Particularly for LEDs, it is not possible to produce useful light without employing a number of light directing and/or light redirecting devices.

Herein lies a problem. In the current state of the art, new models of LEDs are being developed that are more rugged, of higher efficacy, and can operate at higher temperatures; this requires in-kind development of light directing devices and light redirecting devices to realize these benefits. Transitioning to different materials in light directing and/or light redirecting devices for higher temperature purposes (e.g., switching from acrylic secondary lenses to higher operating temperature silicone secondary lenses) has produced a phenomenon in which, under some operating conditions, LED lighting fixtures exhibit condensation. Said condensation collects on the inside of the emitting face of the fixture housing and adversely impacts the production of useful light by, e.g., diffusing light. Thus, there is room for improvement in the art.

III. SUMMARY OF THE INVENTION

Under some operating conditions of LED lighting fixtures, a phenomenon has been observed wherein condensation forms on the inner side of the emitting face of the fixture housing. Condensation has been observed in LED lighting fixtures operated outdoors in cold environments, particularly in specialty LED lighting fixtures that have a large number of light directing and/or light redirecting devices, and/or are operated at high current (which correlates to a higher internal housing temperature). It is believed that in the transition to higher operating temperatures, operating conditions, and materials, more moisture is released, evaporated, or otherwise produced during normal fixture operation, and when normal fixture operation occurs in a cold ambient environment, said release of moisture results in condensation; this is because said fixtures are sealed at the factory prior to shipping (e.g., to deter theft, to prevent dirt from coating light directing and/or light redirecting devices) and so moisture is trapped within the internal space of the fixture housing. A rough analogy is instructive. Sufficient raising of the temperature of a metal pot of cold water on a stove, with a glass lid or cover, can eventually results in some change of liquid state to gas state. This evaporation then results in condensation on the interior side of the glass lid or cover. Similarly, in the present context, condensation or other moisture formation on any part of a glass at the emitting face of a lighting fixture would also affect the transmission of light from the sources inside the lighting fixture through the glass due to the condensation.

To date, there is no known commercially available solution to correcting or preventing this phenomenon. For example, commercially implemented membrane vents which have long been used with sealed LED lighting fixtures are effective at maintaining a desired pressure in a sealed LED lighting fixture, but have not been shown to provide a similar benefit to maintaining a desired moisture level. In fact, in outdoor or non-hermetic/environmentally controlled environments, the presence of a membrane vent can actually cause moisture ingress over time. Also, it is not viable to simply leave lighting fixtures unsealed because, as discussed, dirt can accumulate on light directing and/or light redirecting devices and adversely impact the production of useful light by, e.g., diffusing light or reducing transmission efficiency.

It is therefore a principle object, feature, advantage, or aspect of the present invention to improve over the state of the art and/or address problems, issues, or deficiencies in the art.

Envisioned are apparatus, methods, and systems for retrofitting or otherwise modifying sealed LED lighting fixtures already in operation (i.e., in situ) to reduce moisture which can cause condensation under at least some operating conditions. An LED lighting fixture field-modified in this manner is then sealed and operated until its natural end of life. As envisioned, by reducing moisture, moisture is not removed from the fixture entirely; rather, it is absorbed by desiccant material exposed to an internal space of the fixture so it is not available to cause condensation and impact the usefulness of light produced from the lighting fixture. This is important to note because future operation of the LED lighting fixture will result in the ingress of moisture (e.g., via a membrane vent), and so by leaving the desiccant in the lighting fixture (or otherwise exposed to the internal space of the lighting fixture) there is an opportunity to provide ongoing reduction of moisture which can cause condensation. This can include a sufficient type, quantity, and moisture-gathering capacity of desiccant material to effectively function without maintenance or change-out for a predicted or normal operating life of the fixture, which could be years if not decades.

Further objects, features, advantages, or aspects of the present invention may include one or more of the following:
 a. adaptation and application of the aforementioned apparatus, methods, and systems for a factory setting (e.g., to avoid the phenomenon entirely);
 b. adaptation and application of the aforementioned apparatus, methods, and systems across a range of desiccant material forms, compositions, and capacity to absorb moisture; and
 c. apparatus, methods, and systems for determining an adequate amount of said desiccant material regardless of the source of said moisture.

These and other objects, features, advantages, or aspects of the present invention will become more apparent with reference to the accompanying specification and claims.

IV. BRIEF DESCRIPTION OF THE DRAWINGS

From time-to-time in this description reference will be taken to the drawings which are identified by figure number and are summarized below.

Figure 2:
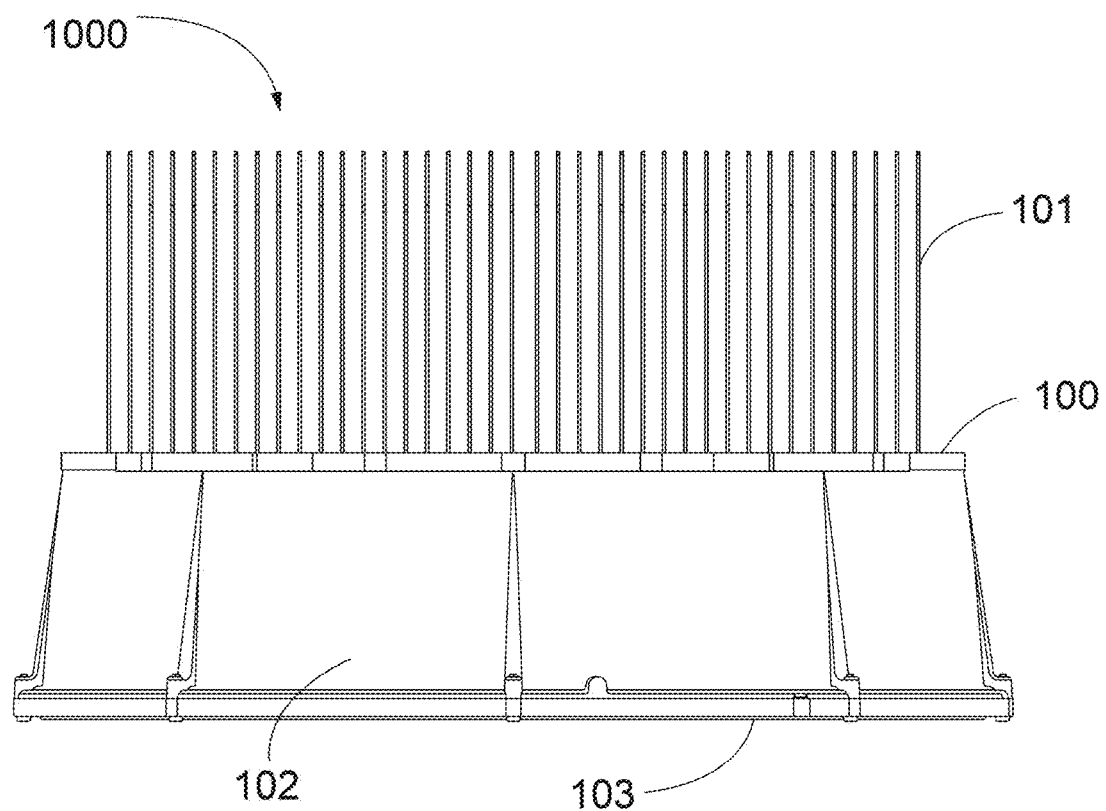
Figure 3:
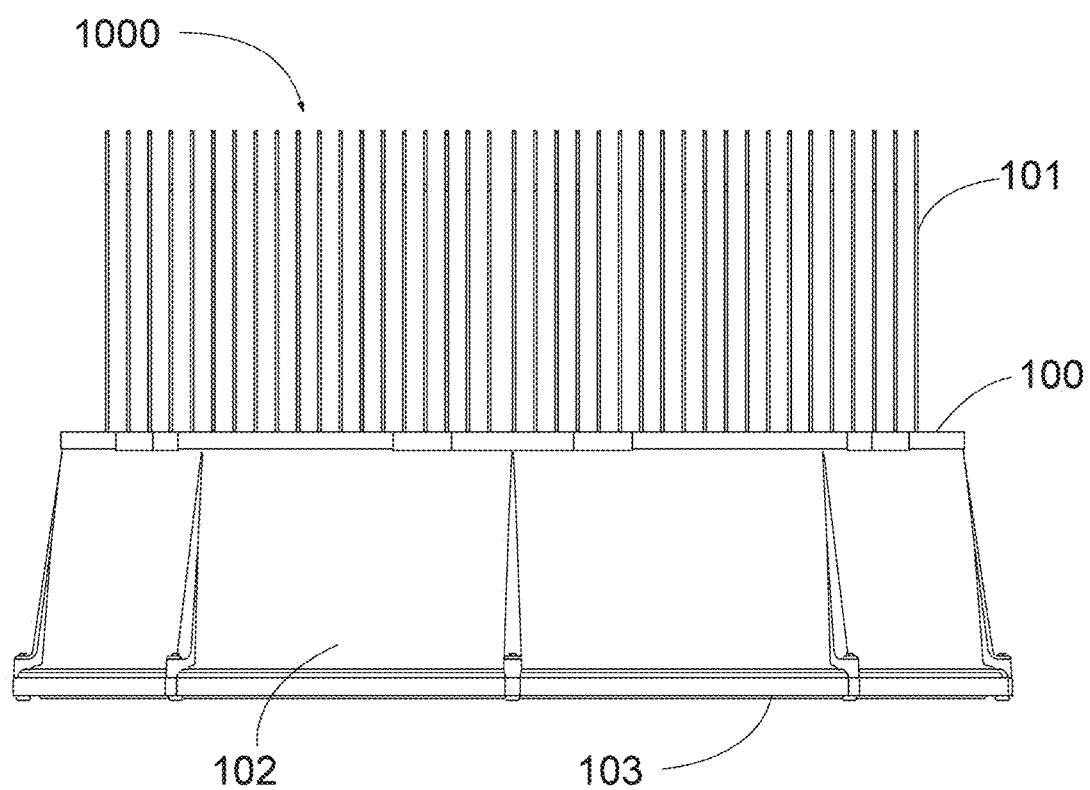
Figure 4:
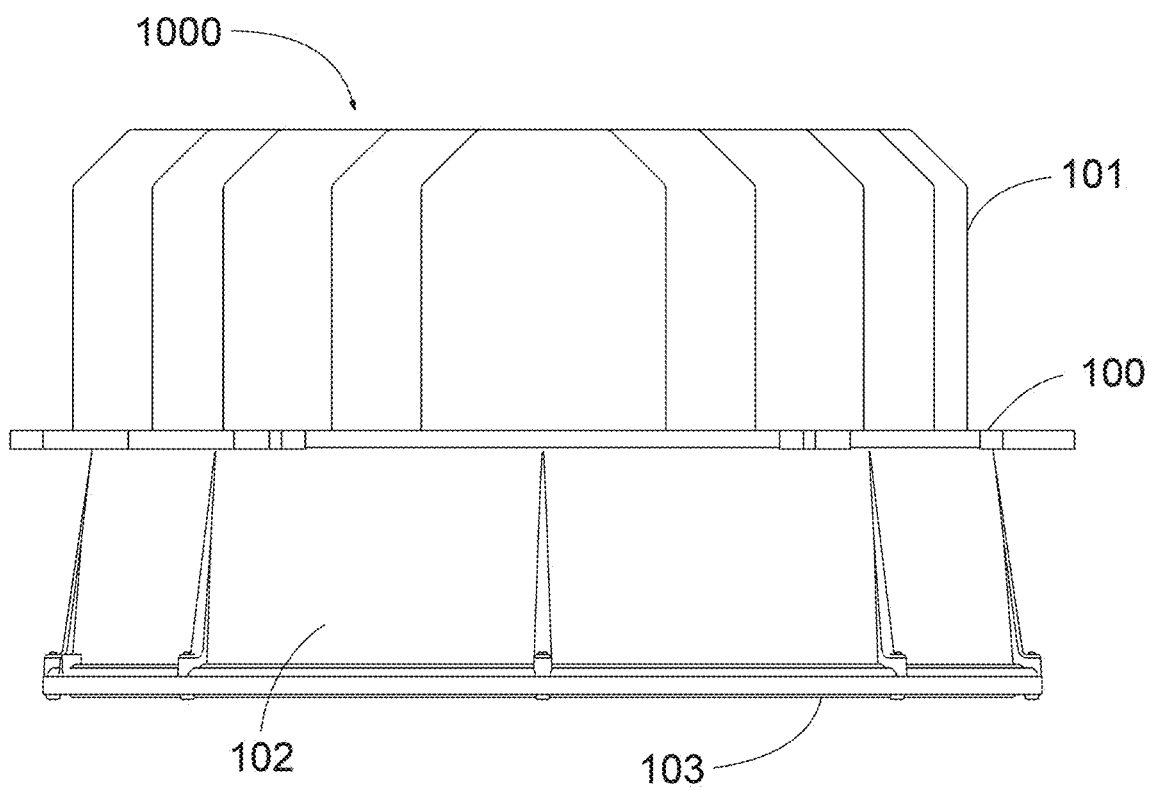
Figure 5:
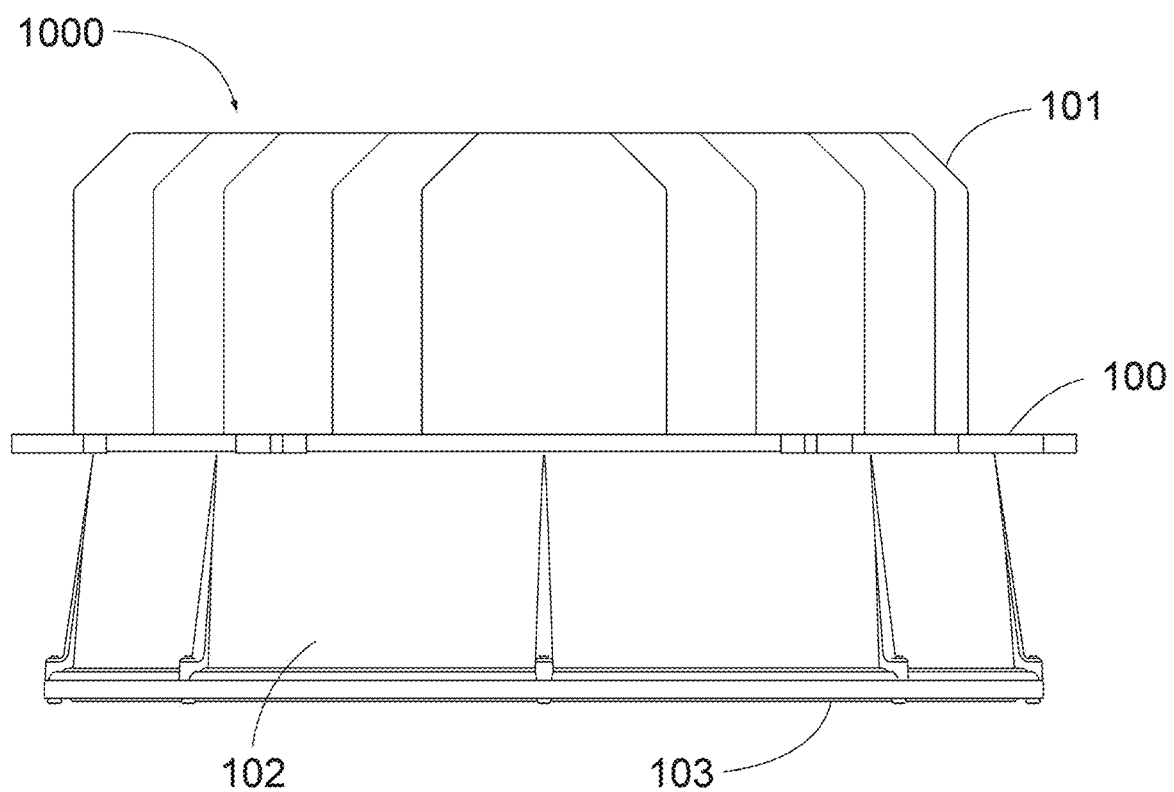
Figure 6:
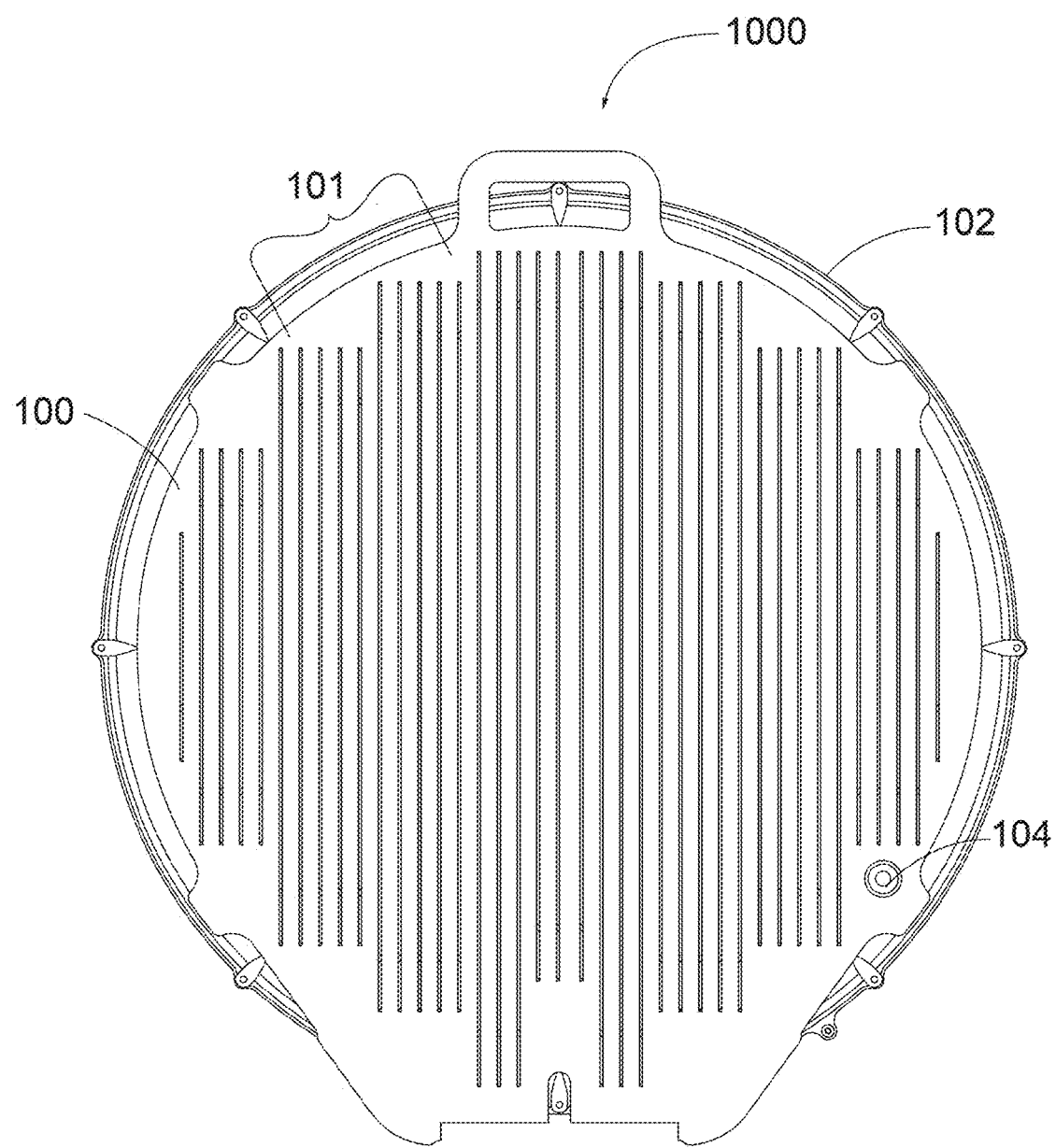
Figure 7:
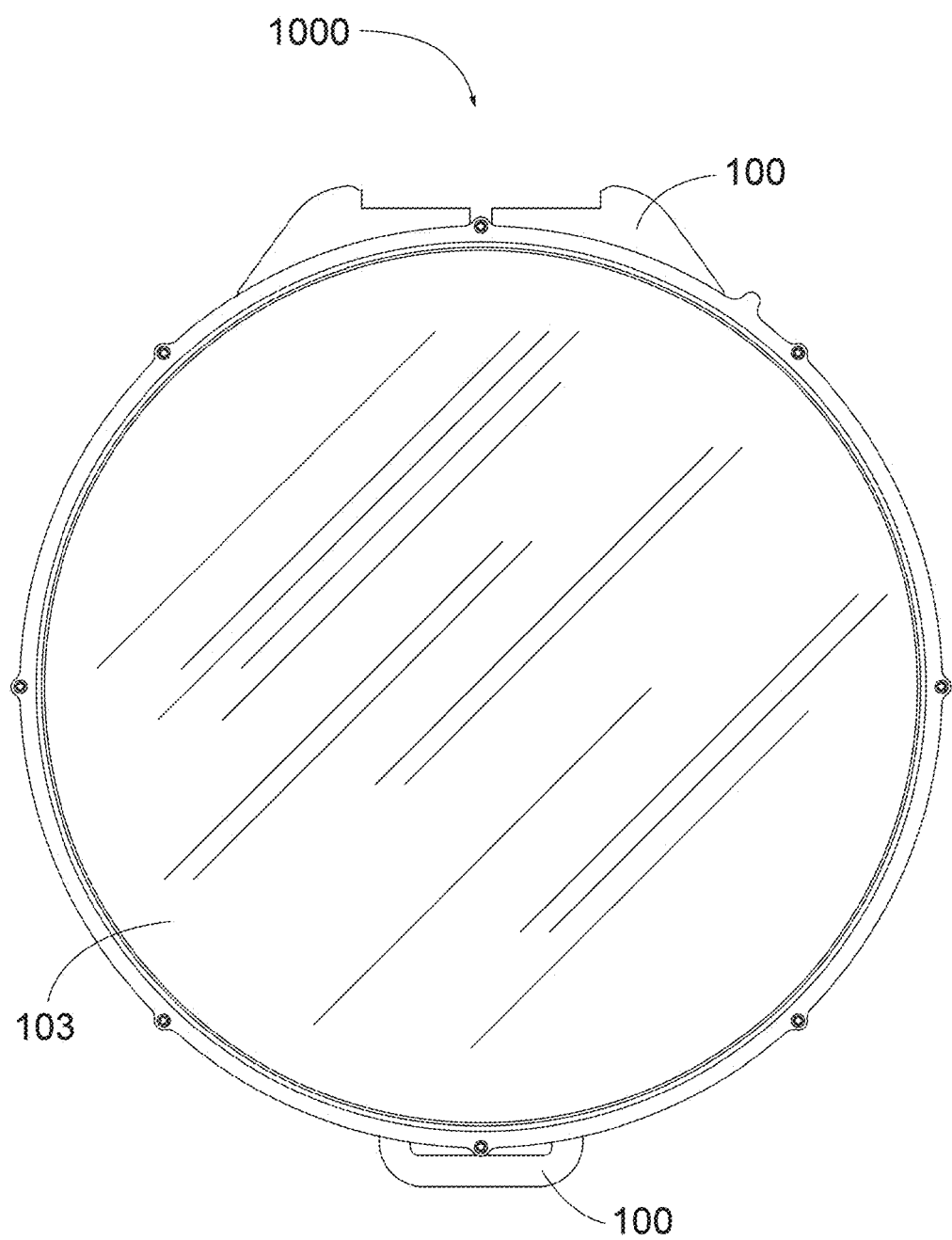

FIGS. 1-7 illustrate various views of a typical outdoor and/or specialty LED lighting fixture which might experience condensation under at least some operating conditions; note that FIGS. 1-7 do not illustrate the lighting fixture in any particular operational orientation/aiming. FIG. 1 illustrates a perspective view, FIG. 2 illustrates a front view, FIG. 3 illustrates a back view, FIG. 4 illustrates a right side view, FIG. 5 illustrates a left side view, FIG. 6 illustrates a top view, and FIG. 7 illustrates a bottom view. Note that in FIG. 7 the emitting face glass is illustrated as opaque (though this is merely for convenience).

Figure 8:
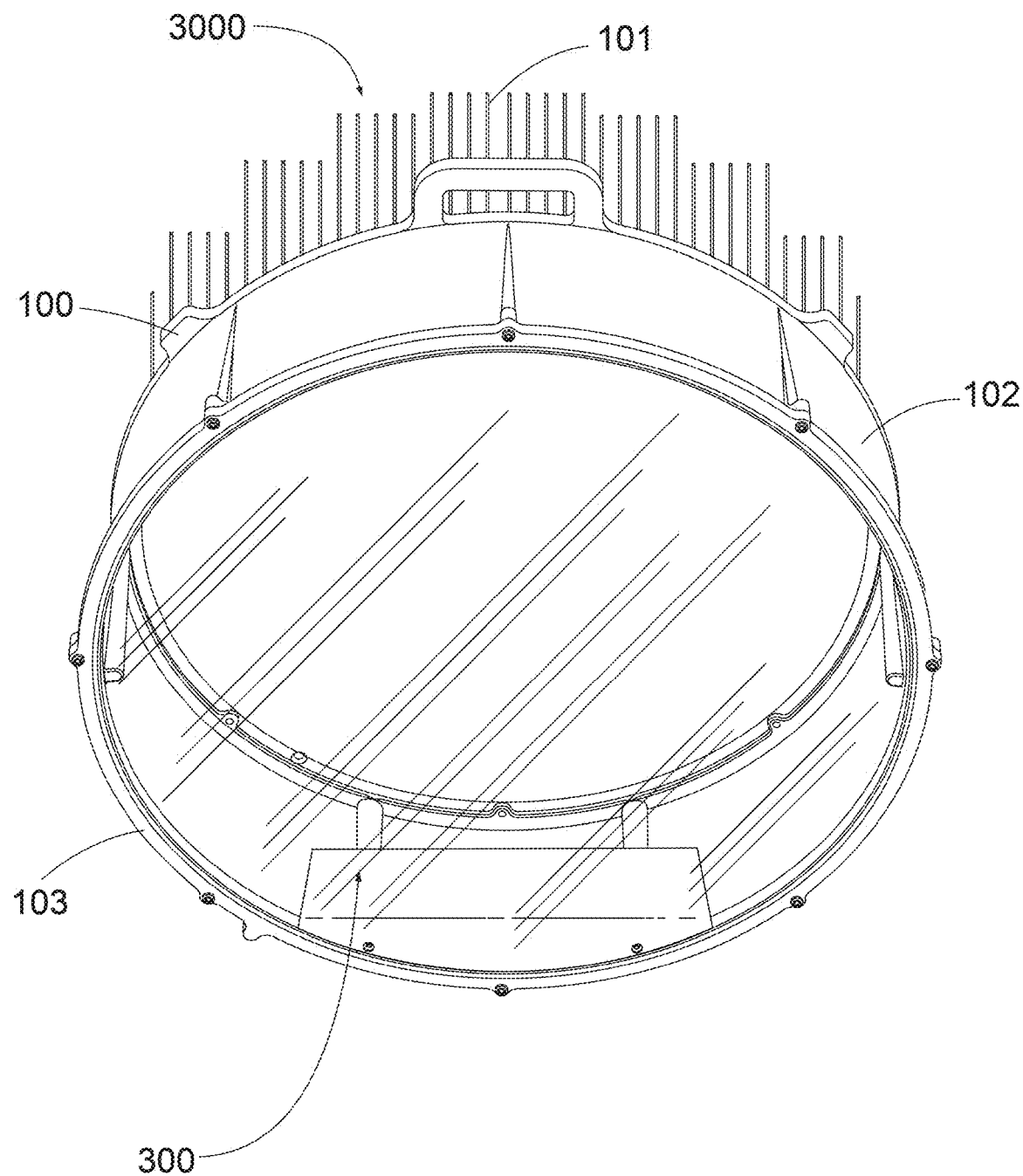
Figure 9:
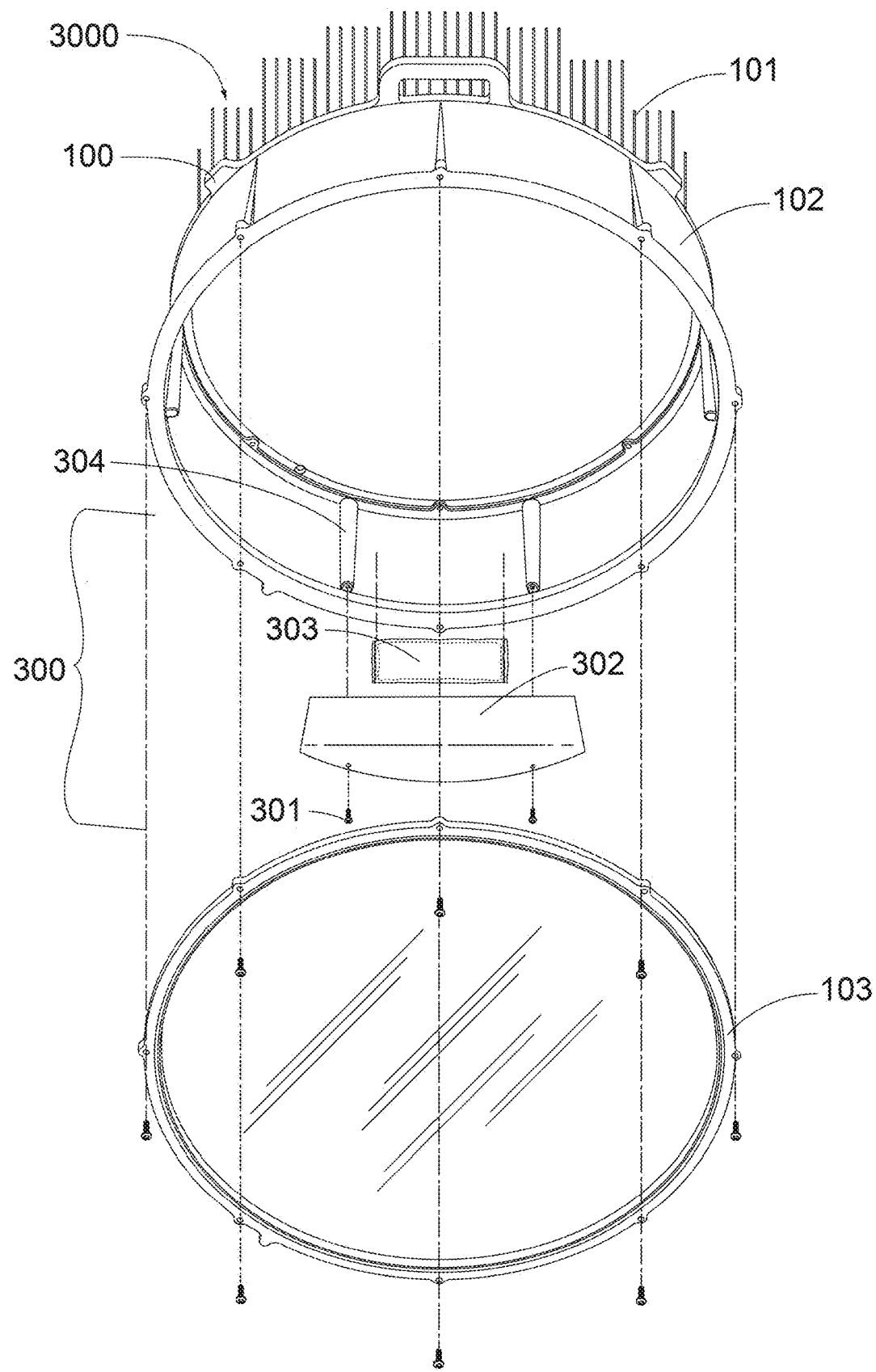

FIGS. 8 and 9 illustrate various views of the fixture of FIGS. 1-7 as modified according to aspects of the present invention; here a first embodiment including an interior bagged desiccant in whatever form (e.g., a plurality of relatively small particles, larger collective masses, etc.) with associated structure in the lower hemisphere of the lighting fixture. FIG. 8 illustrates a front perspective view more or less in a correct operational orientation (e.g., 30 degrees down from horizontal) and FIG. 9 illustrates a reduced-in-scale partially exploded front perspective view; note that for clarity no LEDs, LED boards, light directing and/or light redirecting devices, or electrical connections are illustrated.

Figure 10:
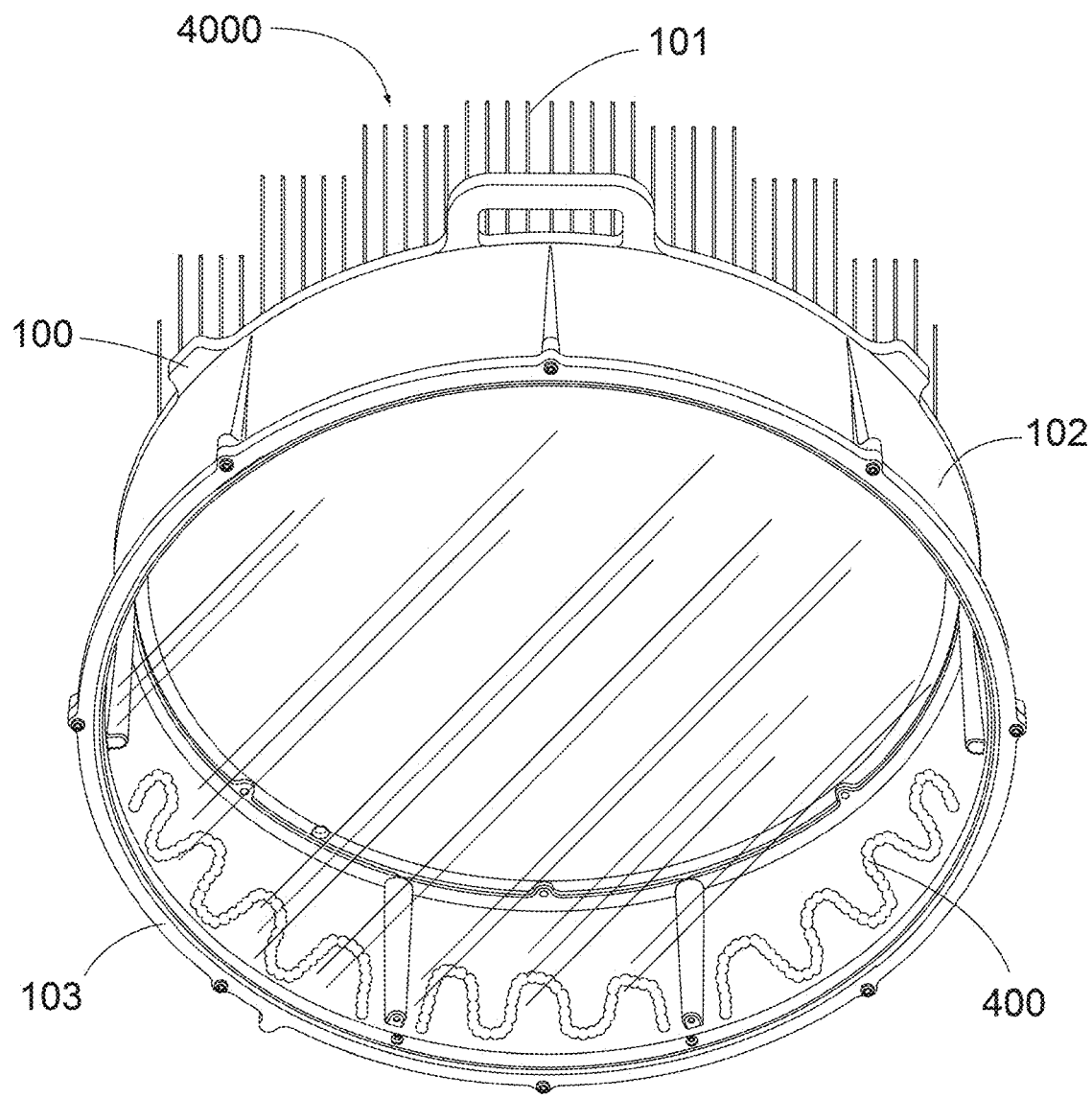
Figure 11:
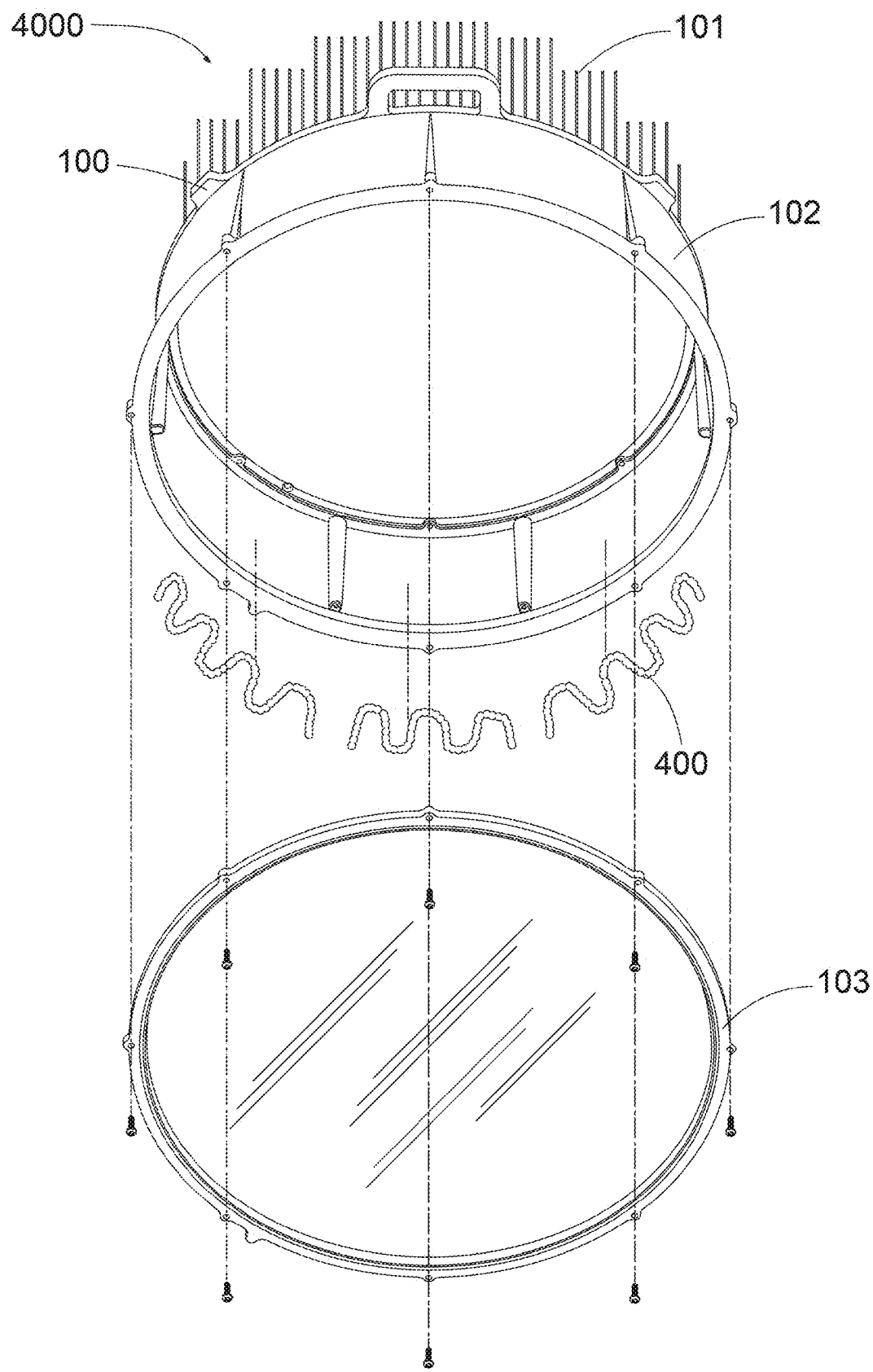

FIGS. 10 and 11 illustrate various views of the fixture of FIGS. 1-7 as modified according to aspects of the present invention; here a second embodiment including an interior moldable desiccant (e.g., a manually malleable or plastic volume or mass) in the lower hemisphere of the lighting fixture. FIG. 10 illustrates a front perspective view more or less in a correct operational orientation (e.g., 30 degrees down from horizontal) and FIG. 11 illustrates a reduced-in-scale partially exploded front perspective view; note that for clarity no LEDs, LED boards, light directing and/or light redirecting devices, or electrical connections are illustrated.

Figure 12:
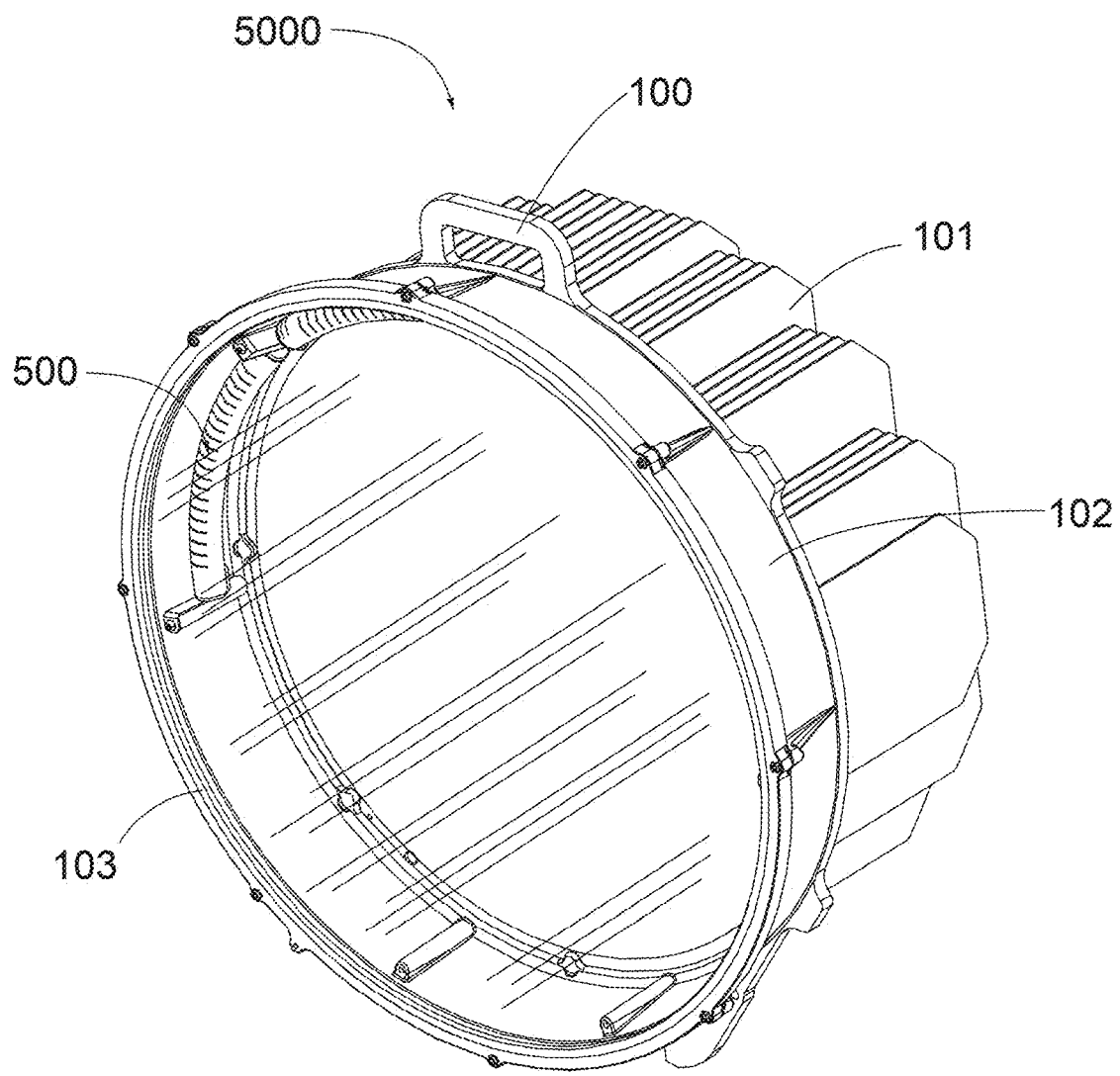
Figure 13:
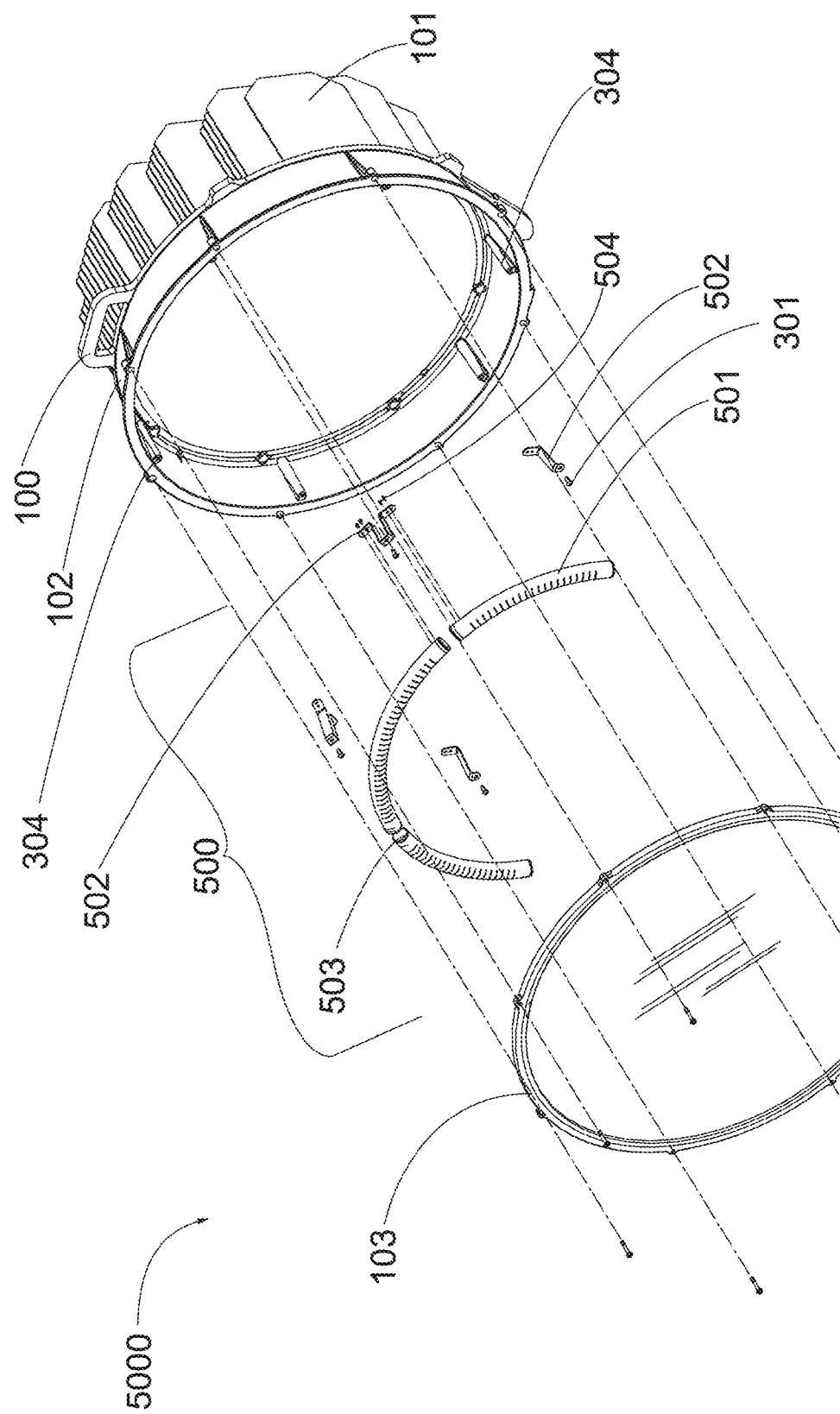

FIGS. 12 and 13 illustrate various views of the fixture of FIGS. 1-7 as modified according to aspects of the present invention; here a third embodiment including an interior loose desiccant (e.g., plurality of relatively small particles) in the upper hemisphere of the fixture. FIG. 12 illustrates a perspective view more or less in a correct operational orientation (e.g., 30 degrees down from horizontal) and FIG. 13 illustrates a reduced-in-scale partially exploded perspective view; note that for clarity no LEDs, LED boards, light directing and/or light redirecting devices, electrical connections, or desiccant are illustrated, and further note that for clarity some fastening devices and explosion lines have been omitted.

Figure 14:
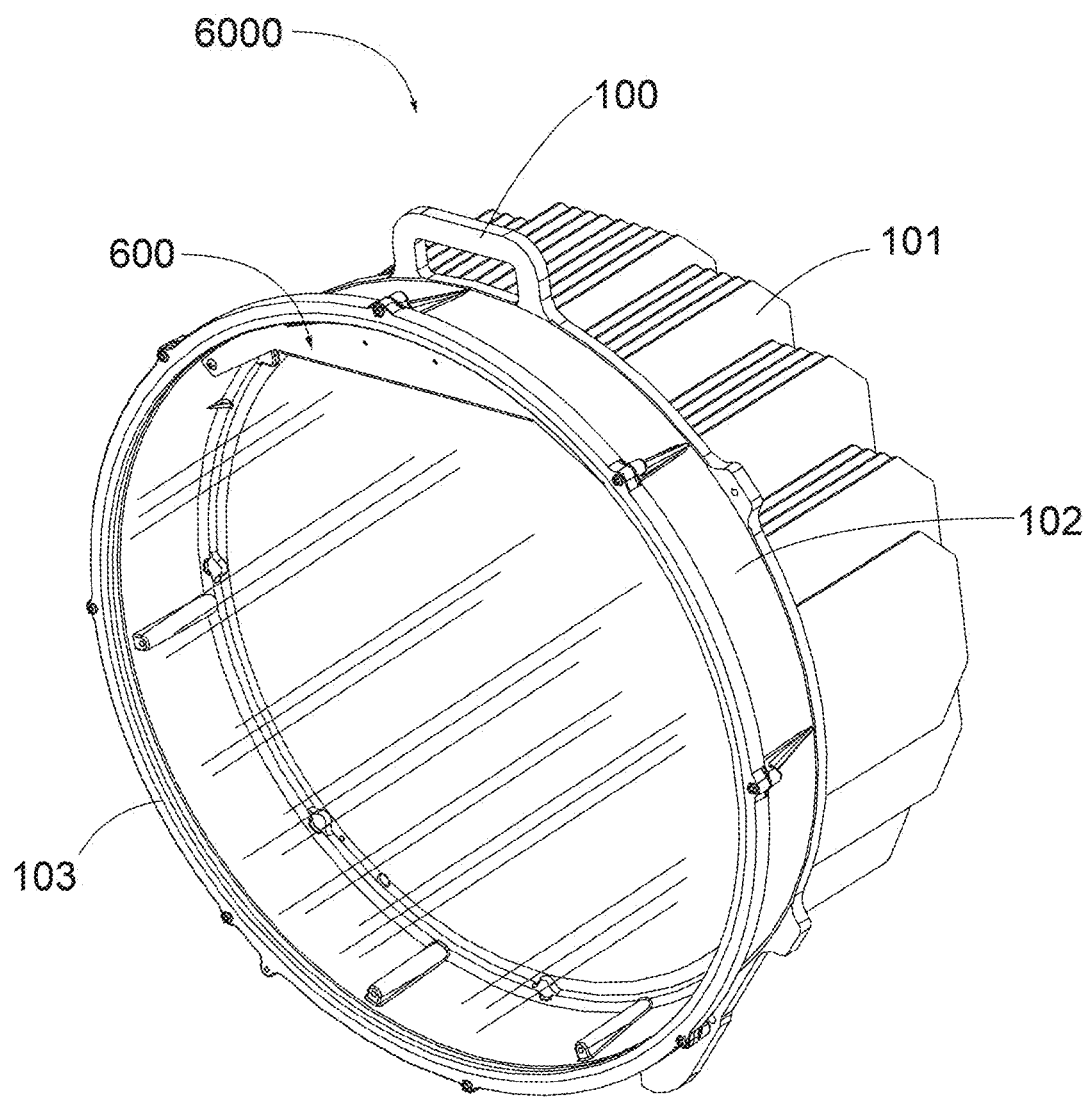
Figure 15:
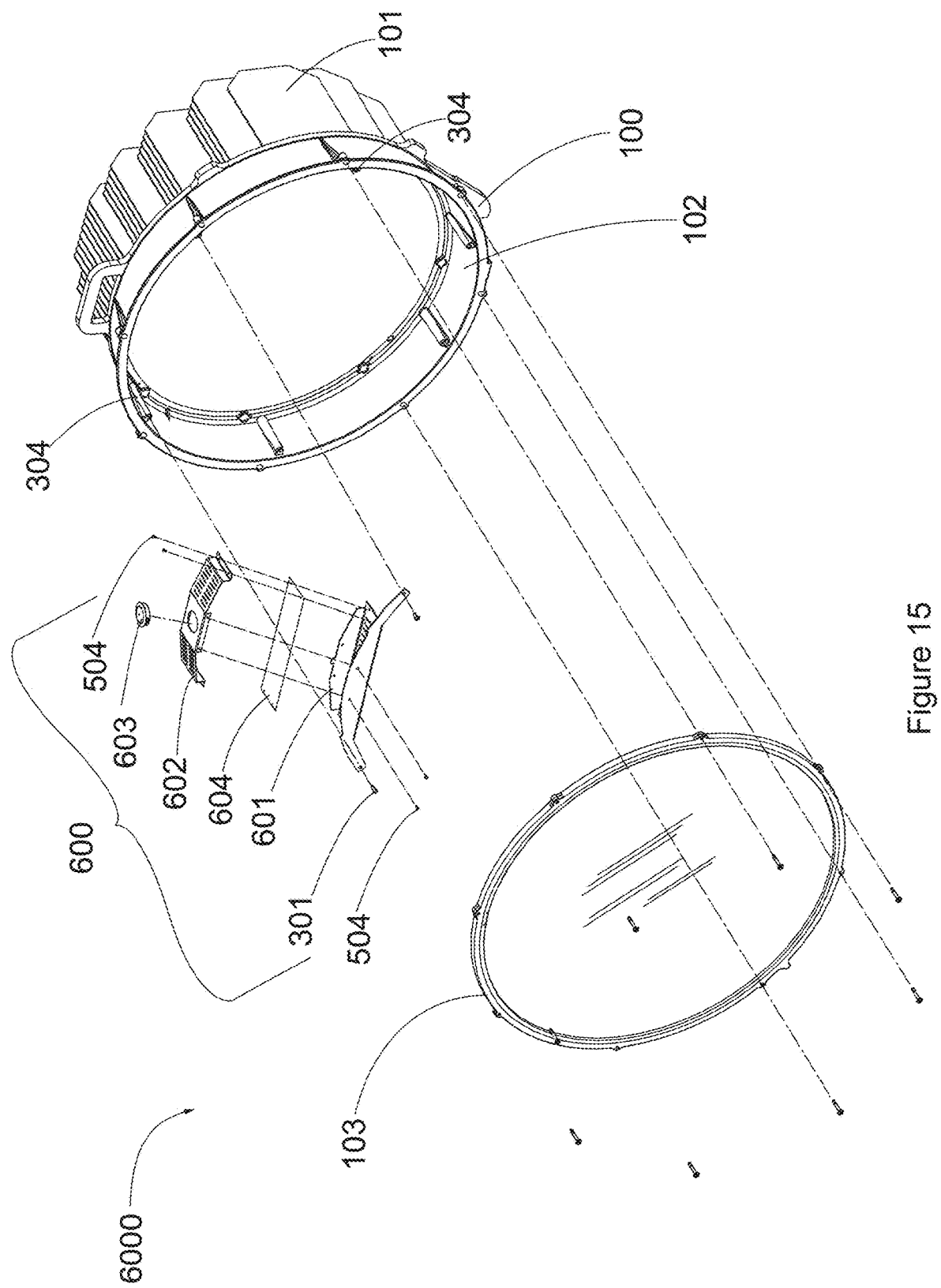

FIGS. 14 and 15 illustrate various views of the fixture of FIGS. 1-7 as modified according to aspects of the present invention; here a fourth embodiment including an interior loose or bagged desiccant in the upper hemisphere of the fixture. FIG. 14 illustrates a perspective view more or less in a correct operational orientation (e.g., 30 degrees down from horizontal) and FIG. 15 illustrates a reduced-in-scale partially exploded perspective view; note that for clarity no LEDs, LED boards, light directing and/or light redirecting devices, electrical connections, or desiccant are illustrated, and further note that for clarity some fastening devices and explosion lines have been omitted.

Figure 16:
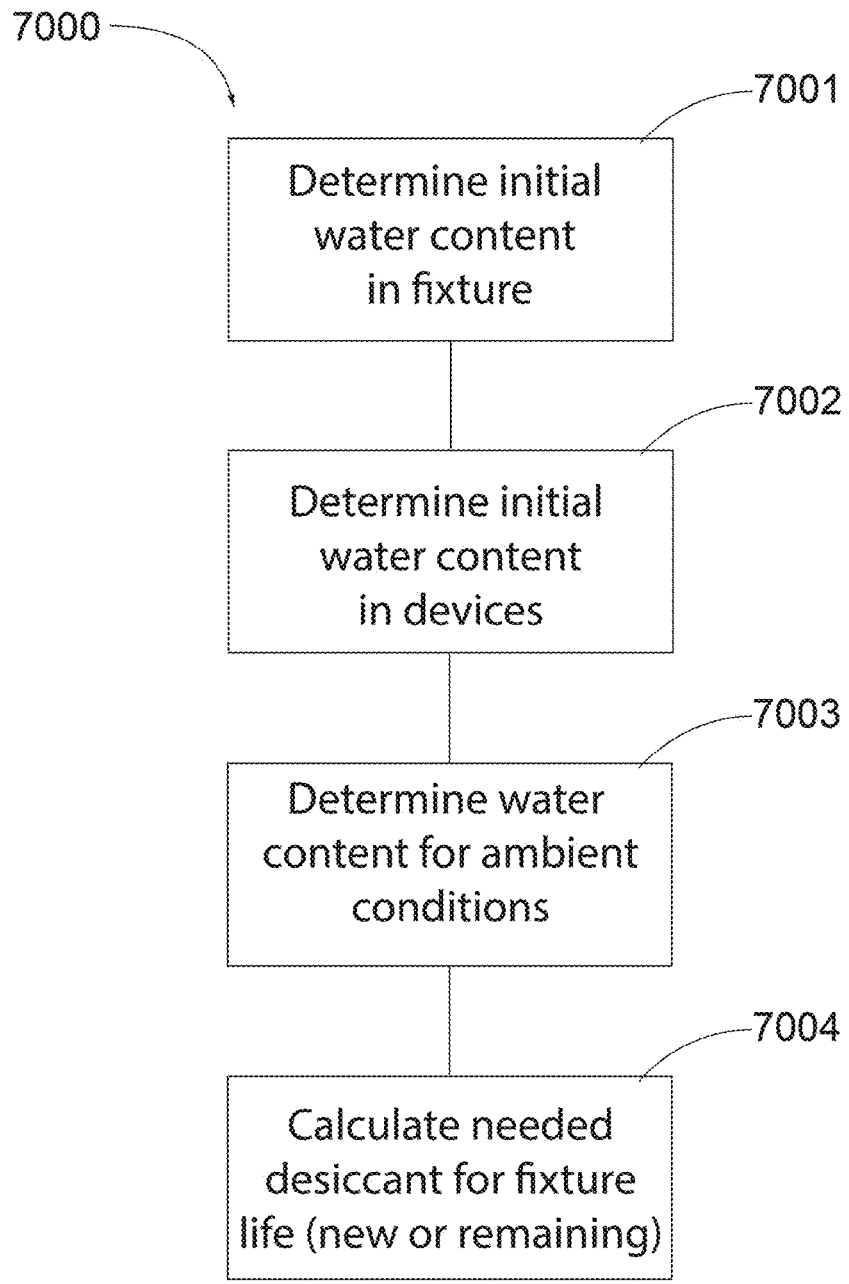

FIG. 16 illustrates one possible method of calculating a needed amount of desiccant to reduce moisture given anticipated ambient conditions, operating conditions, and/or lifespan of a lighting fixture having a defined internal space.

FIGS. 17 and 18A-C are FIG. 6A and FIGS. 13A-C, respectively, of incorporated U.S. Patent Publication No. 2014/0092593 and illustrate non-limiting examples of such things as, inter alia, LED light sources, mounts, and orientations inside a fixture, a glass cover that can seal the internal space of the fixture, light directing and light redirecting devices, which are capable individually or in any combination in the exemplary embodiments described herein.

V. DETAILED DESCRIPTION OF EXEMPLARY EMBODIMENTS

A. Overview

To further an understanding of the present invention, specific exemplary embodiments according to the present invention will be described in detail. Frequent mention will be made in this description to the drawings. Reference numbers will be used to indicate certain parts in the drawings. Unless otherwise stated, the same reference numbers will be used to indicate the same parts throughout the drawings.

Regarding terminology, the terms "lens" and "glass" are used herein to describe different parts, though they are sometimes used interchangeably in the art. Generally speaking, as described herein, an LED light source includes an integral primary lens, might include a secondary lens (e.g., for beam shaping), and a fixture itself includes a glass or similar member to close (and optionally, seal) against an opening into a housing where a plurality of LEDs with their associated primary and secondary lenses are housed (i.e., an emitting face). Said glass typically is at least substantially light-transmissive. It might not substantially alter that light transmission or cause any substantial beam shaping from the light generated by the light source(s) and light directing and/or redirecting devices sealed in the fixture, but, under some conditions, might do either (e.g., if coated with an anti-reflective coating or might have a lens-like characteristic that directs or redirects light). Thus, use of the terms lens and glass should be taken in the context in which they are used. Other terms are used by way of convenience and are generally interchangeable: "water" or "moisture"; and "device", "feature", "structure", "part" or "portion", for example.

With further regards to terminology, aspects of the present invention are directed to reducing moisture in LED lighting fixtures. It is important to note that in one context moisture is described as being absorbed by one or more desiccant materials; the terms "absorb" and "absorption" are used generically to indicate the taking in and holding of a gas or liquid (or vapor) regardless of normal operating conditions (e.g., if the interior temperature promotes evaporation), and no discussion is given herein regarding specific forms of absorption (e.g., solvent, osmotic, capillary, adsorption)—all should be understood to be possible and envisioned under use of the general terms "absorb" and "absorption". Further, reduction of moisture can include moisture in liquid form (e.g., condensation) or in gas form (sometimes referred to as vapor in the industry)—and while water is specifically referenced, aspects of the present invention are not limited to such (e.g., other substances, mixtures, or mixtures with water with at least some analogous properties to water, including phase change between liquid and gas with temperature). Lastly, reduction of moisture does not necessarily mean complete removal of moisture. For example, at least some embodiments are designed such that desiccant is removable (e.g., when a desiccant material is fully saturated)—in this sense moisture is gathered by the desiccant over some time (though some is still technically existing in the internal space; e.g., in or on parts of the fixture or in the volume of air remaining inside the fixture), and then that moisture gathered and trapped by the desiccant is fully removed from the internal space. In other embodiments the desiccant is never removed and so technically the moisture always exists in the internal space but it is reduced in the sense that the volume gathered and trapped by the desiccant is not available for causing the adverse effects already described, even during conditions that risk causing undesirable moisture, including higher temperatures during light source operation at higher power levels. It should be appreciated that regardless of whether moisture gathered and trapped by the desiccant is fully removed from the lighting fixture or merely gathered and trapped at some point by the desiccant within the fixture but the desiccant is not removed, the goal is to reduce condensation which can negatively impact a lighting design by, e.g., reducing the portion of light that is useful—and that this can be achieved with permanent or removable means and methods, and regardless of where or how the moisture is absorbed. All of the aforementioned are possible, and envisioned, according to aspects of the present invention.

B. LED Lighting Fixture, Generally

The exemplary embodiments envision apparatus, methods, and systems of reducing moisture which gathers, forms, condenses, or otherwise exists on an interior surface of an LED lighting fixture under certain operating conditions. Generally speaking, LED lighting fixtures which exhibit condensation are operated outdoors and/or at elevated temperatures (e.g., due to a large number of LEDs and/or high operating current). Said lighting fixtures are typically elevated and angled downwardly towards a target area (e.g., at 30 degrees below horizontal with varying degrees of panning left and right). In this operational orientation, condensation or excess moisture is most likely to collect on the lower hemisphere of a fixture glass at the emitting face of the fixture because of gravity. Of course, this could differ based on different operational orientations or with different styles/shapes of glass. U.S. Patent Publication No. 2014/0092593—FIG. 6A and FIGS. 13A-C of which are reproduced as FIGS. 17 and 18A-C herein—is incorporated by reference herein in its entirety and illustrates some possible operational orientations, styles/shapes of glass, and examples of LEDs, LED boards, light directing devices, and light redirecting devices.

FIGS. 1-7 illustrate a generic LED lighting fixture 1000 as just described, which might exhibit condensation under some operating conditions. Fixture 1000 generally includes a thermally conductive substrate 100 which acts as the mounting surface for LEDs on one side (i.e., the side internal to the fixture), and which also acts as the mounting surface for one or more heat sink/radiating fins 101 on one side (i.e., the side generally opposite to the LED surface side and external to the fixture). An internal space in the fixture is defined by one side of substrate 100, inner surfaces of walls of a housing 102, and an inner surface of an emitting face glass 103 (also referred to as a glass cover) insomuch that it covers an open face of the lighting fixture. It is this internal space of the housing, and sealed with glass 103, which heats and cools, contains the LEDs and at least some associated light directing and/or light redirecting devices (see LED modules 10 of FIGS. 17-18C), and is generally desired to be sealed (e.g., to prevent dirt accumulation), yet maintain an acceptable pressure via commercially available membrane vents 104 (e.g., any of the outdoor protective vents available from W. L. Gore & Associates, Inc., Newark, Del., USA). Of course, in some cases, glass 103 forms a part of a larger assembly including at least a sealing device and lens ring designed so to be removable (see, e.g., U.S. Pat. No. 7,527,393 incorporated by reference herein). However, regardless of whether emitting face glass 103 is designed to be removable or the permanent seal must be broken to modify lighting fixtures already in the field, a method for reducing moisture in said LED lighting fixtures is as follows.

C. Exemplary Method

To reduce moisture, the exemplary embodiments rely upon desiccant materials; different methods of installation, location of material relative an internal space of the lighting fixture, form and composition of desiccant (e.g., gel, molecular sieve), type of desiccant (e.g., clay, silica, calcium chloride), and the like are explored. Regardless, it is important to first determine, predict, or estimate how much moisture is present (e.g., in the case of field repairs) or will be present over the life of a fixture (e.g., if designing for it in a factory setting); one possible method of doing such is illustrated in FIG. 16.

According to a first step 7001 of method 7000, the initial water content in the fixture is determined. Step 7001 requires some basic knowledge of relative humidity and temperature when the lighting fixture was first assembled/sealed to understand how much water is present in a defined internal space—this knowledge should be readily known by the manufacturer of the fixture, but could also be estimated. For example, assuming an internal fixture space volume of approximately 1400 cubic inches, and fixture sealing at approximately 25° C. and 60% relative humidity, yields an anticipated water weight of approximately 0.4 grams in the air of the internal space. However, as discussed earlier, this is not the entirety of moisture which may be present in the internal space. For example, some moisture whether in liquid, solid, or gas phase may not be gathered and trapped by the desiccant. But it is important to understand that any gathering and trapping by the desiccant can have beneficial effects. Some of the remaining moisture may not, as a practical matter, be gathered and trapped by desiccant. But, again, one can estimate or predict even roughly the amount of moisture using the above or similar techniques, and can select type, amount, characteristics and placement of desiccant within a given fixture based on that estimate to promote the benefits of gathering and trapping at least some of what otherwise might result in the moisture producing undesirable optical effects.

A second step 7002 comprises determining, predicting, or estimating the water content in any light directing and/or light redirecting devices themselves (e.g., secondary lenses, holders for secondary lenses). It has been found that silicone secondary lenses are more hygroscopic than acrylic, for example, and therefore, retain more moisture. Therefore, baking/burnout (or other applications of heat) procedures well known to those skilled in the art to disassociate moisture from conventional secondary lenses may not be suitable to fully remove moisture from silicone secondary lenses, for example. Thus, it may not be practically possible to remove all such retained moisture inside the fixture. But, according to aspects of the invention, the exemplary embodiments are beneficial to address at least some interior moisture for the benefits discussed herein. Also, some of the retained moisture in hygroscopic materials, like the moisture gathered and trapped by desiccant, may stay absorbed even during high temperature operating conditions of the fixture, and thus not affect the optical properties of the fixture. Further, moisture can be introduced into the system over time (which is later discussed) in particular, in outdoor or non-hermetic/environmentally controlled environments —and so understanding absorption with respect to the light directing devices and light redirecting devices is a critical step. As such, in accordance with step 7002, light directing and/or light redirecting devices in the internal space may be fully saturated, weighed, moisture removed according to standard baking/burnout procedures, weighed, and the difference in weight assumed to be a minimum water weight retained by the devices. For the specific scenario of approximately 1400 cubic inches of internal fixture space utilizing two-hundred twenty-eight silicone secondary lenses with associated holders, a water weight of approximately 6.5 grams associated with the secondary lenses/holders is reasonable. Similar or analogous techniques can be used for this purpose, and for other parts or materials that have or might have retained water or moisture.

To this point there are two water weights in consideration—that in the air in the fixture, and that associated with the light directing and/or light redirecting devices. According to step 7003 (which is relevant primarily for outdoor and/or non-hermetic environments), water content associated with ambient and operating conditions may be assessed. Typically, LED lighting fixtures used in said outdoor and specialty lighting applications are cycled on and off many times, in every season, for many years. As such, according to step 7003, it is beneficial to look at the ambient conditions in which the lighting fixture will operate—for example, average ambient temperatures and humidity levels, as well as anticipated fixture temperature during operation and number of operating hours—to get an idea of water content. As previously stated, sealed LED lighting fixtures are often equipped with a commercially available membrane vent 104 to maintain adequate pressure, so there is a repeated and regular exchange of air within the fixture (and the moisture it carries) and air outside the fixture (and the moisture it carries). In practice, calculations according to step 7003 will vary greatly depending on operating hours and geographic area, for example, but assuming a lifespan of 10 years and around 50 power-on cycles per year (i.e., where fixtures are fully lit and heat up, and then are turned off and fully cool down), 315 power-off cycles per year (because moisture is being introduced into the system even when LEDs are not in operation, albeit at a different rate), in an average outdoor environment (e.g., a non-powered fixture temperature never more than 40° C. above or below ambient), it is not unreasonable to assume the lighting fixture having the aforementioned internal space would take on approximately 45 grams of water over its lifespan.

Having in hand the anticipated water content from steps 7001, 7002, and 7003, according to step 7004 a total water capacity needed from a desiccant material may be determined. Different desiccants have different weights, different capacities for absorbing moisture, and different material properties (e.g., some may be corrosive or otherwise unsuitable for use near LED boards) all of the aforementioned factor in determining a quantity and type of desiccant according to step 7004. Such information is typically available from desiccant manufacturers, but could be obtained by empirical testing. It is not unreasonable to assume a lighting fixture of the aforementioned characteristics may require a desiccant quantity on the order of 250 grams (assuming 20% water absorption by weight for the desiccant) to absorb an adequate amount of moisture to avoid condensation over the life of the fixture (here, 10 years for a new fixture). If a field repair situation, method 7000 as just described could be modified as needed to address a portion of operating life (e.g., lifespan calculations or estimations based on 1 year of remaining life, for example).

As will be appreciated, the forgoing calculations can be estimates based on the indicated factors. It is not necessarily required they be made with any high precision or accuracy. Such calculations/estimates can be rough and be effective for the purposes herein. One can use techniques, such as are deemed practical, to optimize such calculations/estimates. One can also take the calculation/estimate and, as might be practical, over-design the capacity of the desiccant to have higher confidence that it will be reasonably effective for all foreseeable conditions for a selected amount of time and operation, whether the full expected effective life of the fixture or some fraction thereof.

D. Exemplary Apparatus Embodiment 1

Figure 17:
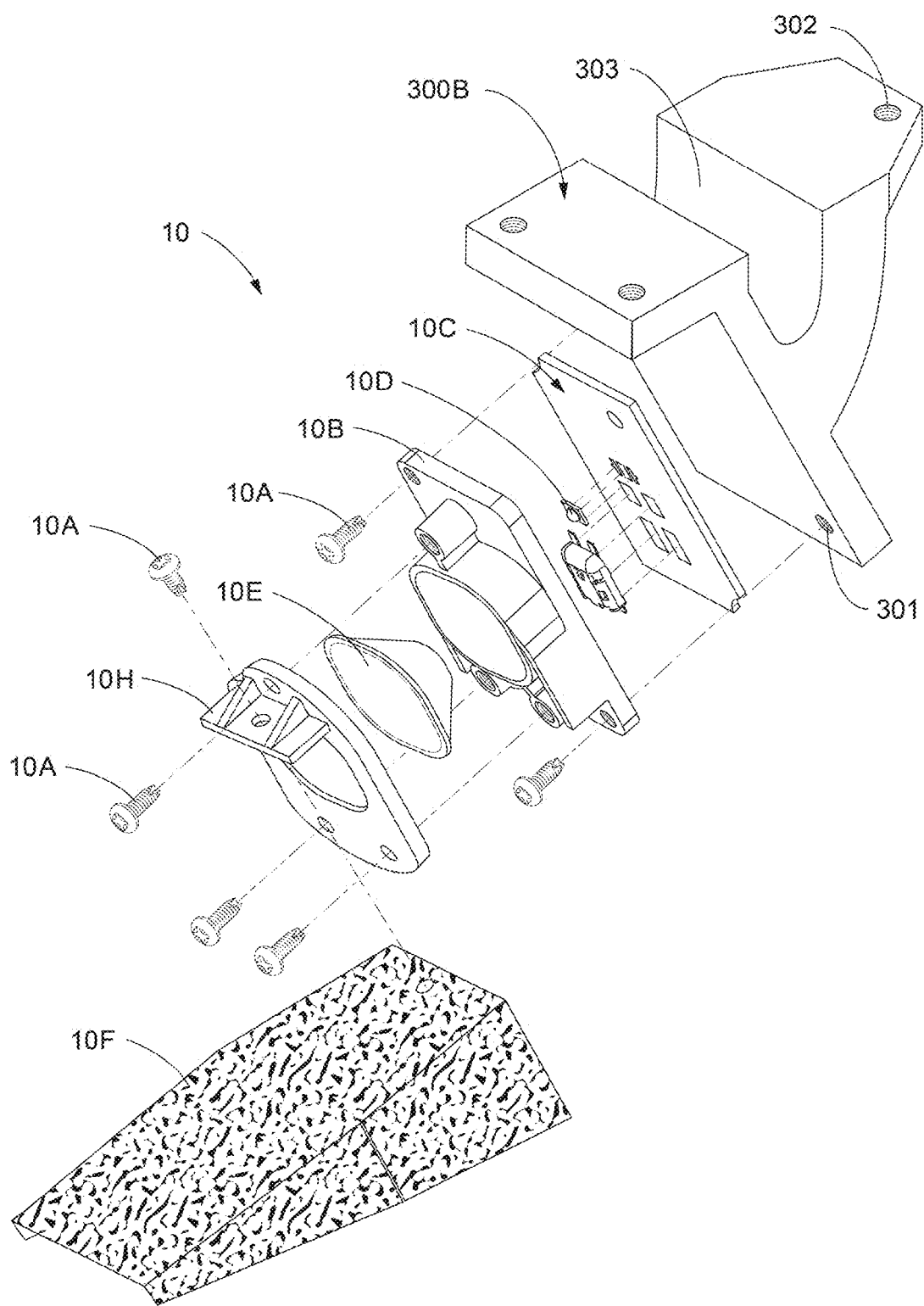
Figure 18C:
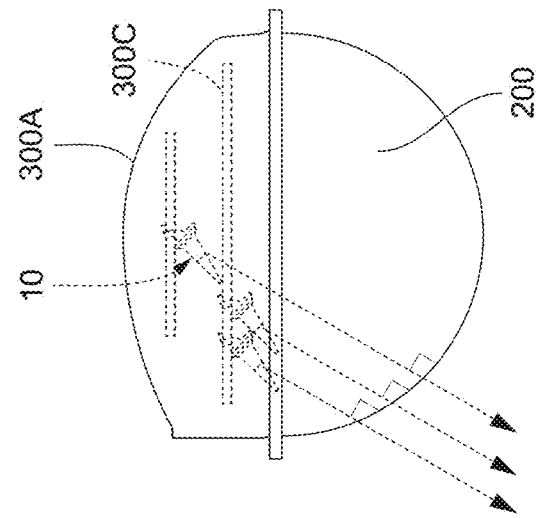
Figure 18B:
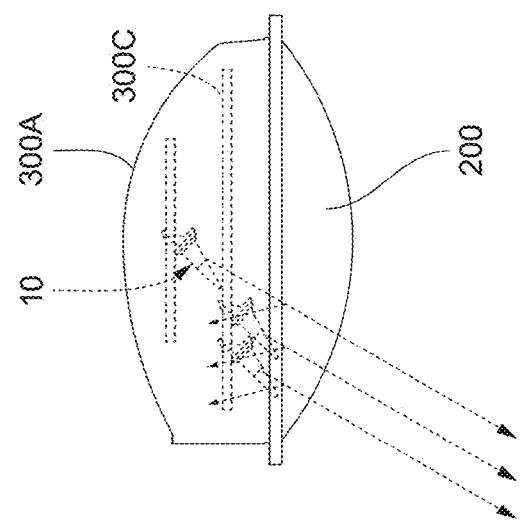
Figure 18A:
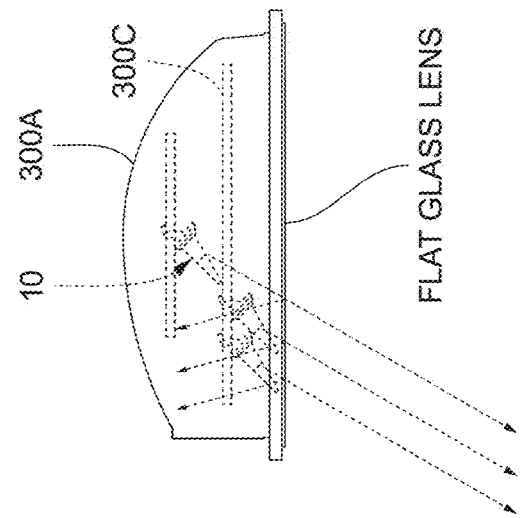

FIGS. 8 and 9 illustrate a first embodiment; note that for clarity no LEDs, LED boards, light directing and/or light redirecting devices, or electrical connections are illustrated (see FIGS. 17-18C for examples of at least some of the aforementioned). Here, a desiccant material 303 of assembly 300 is inserted into housing 102 of fixture 3000, and held in place via fastening devices 301 extending through a hold-down plate 302 and into a complementary portion 304 of housing 102. Here, desiccant material 303 is encased or contained in at least a gas permeable bag (it could be at least partially liquid permeable) so long as the material retains the desiccant. Such bag material can be the same or similar to that used in any of the wide variety of bagged desiccants that are put in packaging of products to absorb moisture. The material of the bag should allow sufficient transfer of moisture to the desiccant to be effective for the purposes described herein.

Primary benefits of the present embodiment are such that (i) since assembly 300 is physically near the site of condensation in the lower hemisphere of the internal space of the fixture, moisture is rapidly collected and removed from interior emitting face of glass 103, and (ii) the present approach can be readily implemented in a factory setting and therefore an amount/type/capacity of desiccant can be selected such that field repairs are never needed during an anticipated fixture lifespan. That being said, the present embodiment (i) does require breaking a seal at glass 103/housing 102 (which is often intended to be a permanent seal) in a field repair situation, (ii) can be difficult to install in a field repair situation if feature 304 (or similar structure) is not available, and (iii) depending on the optical characteristics of part 302, could impact transmission of light from inside the fixture to outside the fixture to the target area so to reduce useful light.

E. Exemplary Apparatus Embodiment 2

FIGS. 10 and 11 illustrate a second embodiment; note that for clarity no LEDs, LED boards, light directing and/or light redirecting devices, or electrical connections are illustrated (see FIGS. 17-18C for examples of at least some of the aforementioned). Here, a desiccant material 400 is piped into, foamed, or otherwise formed in place in some portion of the lower hemisphere of the internal space of fixture 4000. In practice, any of a variety of moldable desiccants could be used; for example, those available from DryTech, Inc., Cookstown, N.J., USA.

Primary benefits of the present embodiment are such that (i) since desiccant 400 is physically near the site of condensation in the lower hemisphere of the internal space of the fixture, moisture is rapidly collected and removed from interior emitting face of glass 103, and (ii) the present approach can be readily implemented in a factory setting and therefore an amount/type/capacity of desiccant can be selected such that field repairs are never needed during an anticipated fixture lifespan. That being said, the present embodiment (i) might require breaking a seal at glass 103/housing 102 in a field repair situation (unless, for example, it can be piped into an existing aperture (e.g., from a removed or modified membrane vent)), and (ii) moldable desiccant may be more expensive or more difficult to apply in situ than in other exemplary embodiments.

F. Exemplary Apparatus Embodiment 3

FIGS. 12 and 13 illustrate a third embodiment; note that for clarity no LEDs, LED boards, light directing and/or light redirecting devices, electrical connections, or desiccant are illustrated (see FIGS. 17-18C for examples of at least some of the aforementioned). Here, a loose desiccant material (not shown) of assembly 500 is poured into a perforated aluminum alloy tube 501 within the internal space of fixture 5000. As can be seen, perforated tube 501 exists in sections, each section closed at opposite ends by a cap 503 once desiccant is inserted, the desiccant having a particle size larger than the perforations so to avoid spilling out (e.g., 2-4 mm diameter silica gel beads available from Dry & Dry, Brea, Calif., USA). One possible means of affixing tubes 501 in situ is to rely upon existing portions 304 of housing 102 by affixing a first portion of a bracket 502 to said portion 304 (e.g., via fastening device 301), and securing (e.g., via rivets 504) a tube section 501 to a second portion of said bracket 502 (note two styles of bracket 502 are illustrated in FIG. 13).

Primary benefits of the present embodiment are such that (i) because assembly 500 is located in the upper hemisphere of the lighting fixture it is not likely useful light will be impacted, and (ii) the present approach can be readily implemented in a factory setting and therefore an amount/type/capacity of desiccant can be selected such that field repairs are never needed during an anticipated fixture lifespan. That being said, the present embodiment is difficult to machine and therefore difficult to mass produce; however, it might be useful in a field repair situation if the tubes could be fed into an existing aperture (e.g., from a removed or modified membrane vent) and secured in situ (whether in the manner just described or otherwise).

G. Exemplary Apparatus Embodiment 4

FIGS. 14 and 15 illustrate a fourth embodiment; note that for clarity no LEDs, LED boards, light directing and/or light redirecting devices, electrical connections, or desiccant are illustrated (see FIGS. 17-18C for examples of at least some of the aforementioned). Here, a loose desiccant material of assembly 600 is poured into an aperture of a first perforated anodized sheet metal cartridge portion 602 which is affixed (e.g., via rivets 504) to a second perforated anodized sheet metal cartridge portion 601. After a sufficient amount of desiccant is inserted into the space defined by parts 602/601—the desiccant having a particle size larger than the perforations so to avoid spilling out (e.g., said silica gel beads) and/or including a filter 604 (e.g., polyester or other fabric able to function at high temperatures)—said aperture is closed with a cap 603. Assembly 600 is affixed to some feature (e.g., existing portion 304) in the upper hemisphere of the internal space of fixture 6000.

Primary benefits of the present embodiment are such that (i) because assembly 600 is located in the upper hemisphere of the lighting fixture it is not likely useful light will be impacted, and (ii) the present approach can be readily implemented in a factory setting and therefore an amount/type/capacity of desiccant can be selected such that field repairs are never needed during an anticipated fixture lifespan. That being said, the present embodiment requires more material and machining than other embodiments set forth.

H. Options and Alternatives

The invention may take many forms and embodiments. The foregoing examples are but a few of those. To give some sense of some options and alternatives, a few examples are given below.

As has been stated, condensation on the interior side of a glass at the emitting face of an LED lighting fixture can be undesirable because it impacts the transmission of light from inside the fixture to outside the fixture to the target area; namely, it reduces the usefulness of light. This could be a concern with fixtures of a different design than those illustrated herein, with light sources other than LEDs, with different or additional light directing and/or light redirecting devices, with different operational orientations, with different styles of fixture glass, and under operating conditions other than those discussed herein. Further, while specific desiccant forms and materials have been discussed herein, others are possible—for example, desiccant can be solid, loose, bagged, etc.—and in such an event, certain devices may likewise take on a different shape or form (e.g., perforations in parts 501, 602, and 601 may be larger, smaller, rounder, more square, etc.).

With further regards to options and alternatives, discussion has been given herein to light directing devices, light redirecting devices, and the glass which seals against the emitting face of a lighting fixture; while some optical properties have been discussed (e.g., anti-reflective properties, beam shaping, light transmission), it is important to note that a wide variety of optical properties exist, and any lighting fixtures or devices having such may likewise benefit from aspects according to the present invention. For example, "glass" as it has been used herein describes a device which seals or closes against the open or emitting face of a lighting fixture; said glass could be fully transmissive, or translucent, or coated with a filter or a color gel, for example.

Lastly, reference has been given herein to fastening devices, and devices which are mounted or affixed to a surface; it is important to note that a variety of means exist to join, abut, or affix devices in a removable or permanent fashion (e.g., taping, gluing, welding, etc.), and that all are possible, and envisioned. For example, many embodiments are described as having to break a seal to be installed in a field repair situation. In many instances, rather than remove the glass of a fixture, existing apertures (e.g., from a removed or modified membrane vent) could be retrofitted in a permanent fashion (e.g., by installing brackets inside the aperture against an inner surface/wall of the fixture) to hold temporary desiccant packets or structure filled with desiccant in an operational orientation such that, when desired, a "used" packet of desiccant can be removed from such a "port" and replaced with a new one, and then sealed (e.g., via a cap). In this sense both permanent and temporary means are used to provide an adequate solution; this and all of the aforementioned is possible, and envisioned.

What is claimed is:

1. A method to reduce moisture in a lighting fixture having an internal space defined by one or more walls of a housing and an at least partially light transmissive cover over a light emitting face and one or more light directing or redirecting devices in the internal space comprising:
   a. determining an initial moisture content in the internal space of the lighting fixture;
   b. determining an initial moisture content in one or more light directing or light redirecting devices in the internal space of the lighting fixture;
   c. determining a moisture content for one or more operating conditions of the lighting fixture;
   d. calculating a needed amount of desiccant to reduce or prevent condensation in the lighting fixture; and
   e. installing the needed amount of desiccant in a manner exposed to the internal space of the lighting fixture.

2. The method of claim 1 wherein the step of determining an initial moisture content in the one or more light directing or light redirecting devices in the internal space of the lighting fixture comprises fully saturating the one or more light directing or light redirecting devices, weighing the fully saturated one or more light directing or light redirecting devices for a saturated weight measurement, heating the one or more light directing or light redirecting devices to effectively disassociate retained moisture, weighing the heated one or more light directing or light redirecting devices for a heated weight measurement, and calculating the difference in saturated and heated weight measurements.

3. The method of claim 1 wherein the step of determining a moisture content for one or more operating conditions of the lighting fixture comprises:
   f. determining an estimated operating lifespan of the lighting fixture;
   g. determining an estimated number of power-off cycles over the estimated operating lifespan of the lighting fixture;
   h. determining a temperature and humidity of ambient conditions at the lighting fixture; and
   i. calculating a rate of moisture introduction into the lighting fixture based, at least in part, on steps f.-h.

4. The method of claim 1 wherein the step of installing the needed amount of desiccant in the lighting fixture comprises:
   j. inserting the desiccant material into a part; and
   k. fastening the part to a predetermined location in the internal space of the lighting fixture.

\* \* \* \* \*